(12) United States Patent
Feng et al.

(10) Patent No.: US 6,529,342 B1
(45) Date of Patent: Mar. 4, 2003

(54) METHOD FOR CONTROLLING FLYING HEIGHT OF A MAGNETIC HEAD

(75) Inventors: Zhu Feng, Fremont, CA (US); Chung Y. Shih, Cupertino, CA (US); Chiu-Shing F. Poon, Oakland, CA (US); Vidyadhara K. Gubbi, Milpitas, CA (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/258,091

(22) Filed: Feb. 24, 1999

Related U.S. Application Data
(60) Provisional application No. 60/075,815, filed on Feb. 24, 1998.

(51) Int. Cl.[7] .......................... G11B 21/02; G11B 27/36
(52) U.S. Cl. ............................................ 360/75; 360/31
(58) Field of Search ........................... 360/254.2, 255.1, 360/254.6, 255.5, 75, 31, 53

(56) References Cited

U.S. PATENT DOCUMENTS

| | | | |
|---|---|---|---|
| 5,153,785 A | * 10/1992 | Muranushi et al. | 360/75 |
| 5,377,058 A | * 12/1994 | Good et al. | 360/75 |
| 5,673,156 A | 9/1997 | Chen et al. | 360/97.01 |
| 5,949,600 A | * 9/1999 | Akiyama et al. | 360/55 |
| 6,005,736 A | * 12/1999 | Schreck | 360/75 |
| 6,031,685 A | 2/2000 | French et al. | 360/97.01 |
| 6,105,421 A | 8/2000 | Yao et al. | 73/105 |
| 6,140,814 A | 10/2000 | Sundaram | 324/212 |
| 6,154,340 A | * 11/2000 | Cameron | 360/105 |
| 6,272,909 B1 | * 8/2001 | Yao et al. | 73/105 |
| 6,366,416 B1 | * 4/2002 | Meyer et al. | 360/25 |
| 6,411,470 B1 | * 6/2002 | Hamilton et al. | 360/246.1 |

\* cited by examiner

*Primary Examiner*—Andrew L. Sniezek
(74) *Attorney, Agent, or Firm*—Fish & Richardson P.C.

(57) ABSTRACT

A method for controlling flying height at the interface of a magnetic head and a magnetic storage medium is described. The flying height is controlled by applying a voltage between head and medium. This controls the vertical movement of the head, and thus, may increase or decrease the flying height. For example, the flying height may be changed with surface texture to achieve high writing/reading density, where the flatness of the medium is high. Also, the contact between the head and medium may be limited where the texture includes projections such as laser bumps.

18 Claims, 17 Drawing Sheets

METHOD FOR CONTROLLING FLYING HEIGHT OF A MAGNETIC HEAD

This application claims priority from Provisional patent application, Serial No. 60/075,815, filed Feb. 24, 1998, entitled "A Novel Technique for Controlling Head/Disk Flying Height and Its Potential Applications".

BACKGROUND OF THE INVENTION

The present invention relates generally to a magnetic head for reading or writing data to or from a magnetic medium, and more particularly, to a method for controlling the flying height between the head and the medium.

Computers typically include a magnetic storage device such as a disk drive. The disk drive may include a magnetic storage medium, such as a magnetic disk, on which data can be recorded or reproduced. Data may be recorded or reproduced on radially spaced data tracks on a surface of the disk. A magnetic head supported by a slider includes a transducer that is positioned over a data track to read data from or write data to the track on the disk surface. The slider also includes an air bearing surface formed on the surface of the slider that opposes the disk surface.

One technique for reading and writing information from the data track includes contact start and stop ("CSS") recording. In CSS recording, the magnetic head rests on an inner portion of the disk surface when the disk is stationary. When the disk rotates, an aerodynamic force is generated between the disk surface and the air bearing surface that causes the head to "fly" over the disk surface. A gap in thus formed between the disk surface and the magnetic head. The height at which the head travels over the disk is typically referred to as the "flying height."

The flying height may be used to determine the recording density or capacity of a data storage system. Lowering the flying height of the head relative to the disk surface may result in higher recording densities. However, as the flying height is reduced, contact between the head and disk increases. This may cause increased damage or wear to the head or disk. Smooth disk surfaces are typically used to minimize the contact between the head and disk due to reduced flying height. However, the head may stick to the surface of the disk, if the roughness of the disk is too small. This may result in disk driven failure, head-disk crash, or loss of recorded data.

One known technique to solve the sticking problem is to form a "texture" pattern on the surface of the disk. This up-and-down wavy pattern changes the surface shape so as to increase the surface roughness. The pattern of the surface texture reduces the contact between the head and disk. Thus, the sticking is reduced.

Certain drawbacks exist with the above configuration. Abrasion may occur between the head and disk. As a result, the head and disk may suffer damage from fine powders generated by the abrasion. Additionally, medium noises due to the surface texture may be generated in the recording frequency domain of the disk, and thus increase the error rate during data reproducing. Also, the head still tends to contact the disk surface, where the slope of the surface texture rises.

Therefore, a need exists for a method for controlling the flying height of a magnetic head that reduces damage to the head during data reproduction or recording as well as increases the data density in a data storage system.

SUMMARY OF THE INVENTION

In general, the present invention is directed to a method for controlling the flying height of a data storage system. The head may be vertically displaced relative to a storage medium in the data storage system by applying a voltage to an interface between the head and the storage medium.

Accordingly, in one aspect, the invention is directed to a method for controlling a magnetic head spaced from a magnetic storage medium. The method.includes forming a dielectric layer on the storage medium, and applying a voltage to an interface between the storage medium and the head to vertically displace the head relative to the storage medium.

Implementations of the invention include one or more of the following. The applied voltage may be an AC or DC voltage. The magnetic head, the storage medium, and the dielectric layer may be modeled as a variable capacitor. The head may be vertically displaced relative to the storage medium to increase the data density between the head and the medium. The head may be controlled to fly at a constant or variable distance relative to a surface of the medium.

In another aspect, the invention is directed to a data storage system that includes a magnetic storage medium. A magnetic head is positioned relative to the storage medium, and a voltage source is electrically coupled to the head to supply a voltage to an interface between the head and the medium to vertically move the head relative to the medium.

The head may include a slider and an air bearing surface formed on a surface of the slider. A transducer assembly may be formed proximate the air bearing surface to read or write data to or from a plurality of tracks on the storage medium.

BRIEF DESCRIPTION OF THE DRAWINGS

The accompanying drawings, which are incorporated in and constitute a part of the specification, illustrate presently preferred embodiments of the invention and, together with the general description of the preferred embodiments given below, serve to explain the principles of the invention.

DESCRIPTION OF THE PREFERRED EMBODIMENTS

The present invention relates to a method for controlling the flying height at the interface between a magnetic head and a magnetic storage medium. The flying height may be defined as the height at which a magnetic head "flies" over a storage medium during the operation of a data storage device. The flying of the head is caused by an aerodynamic lift force generated by the rotation of the storage medium between the head and the medium.

In the preferred embodiment, the flying height may be controlled by applying a voltage to the interface between the head and the medium. The applied voltage may then be used to adjust the vertical displacement of the head relative to the surface of the medium.

Figure 1:
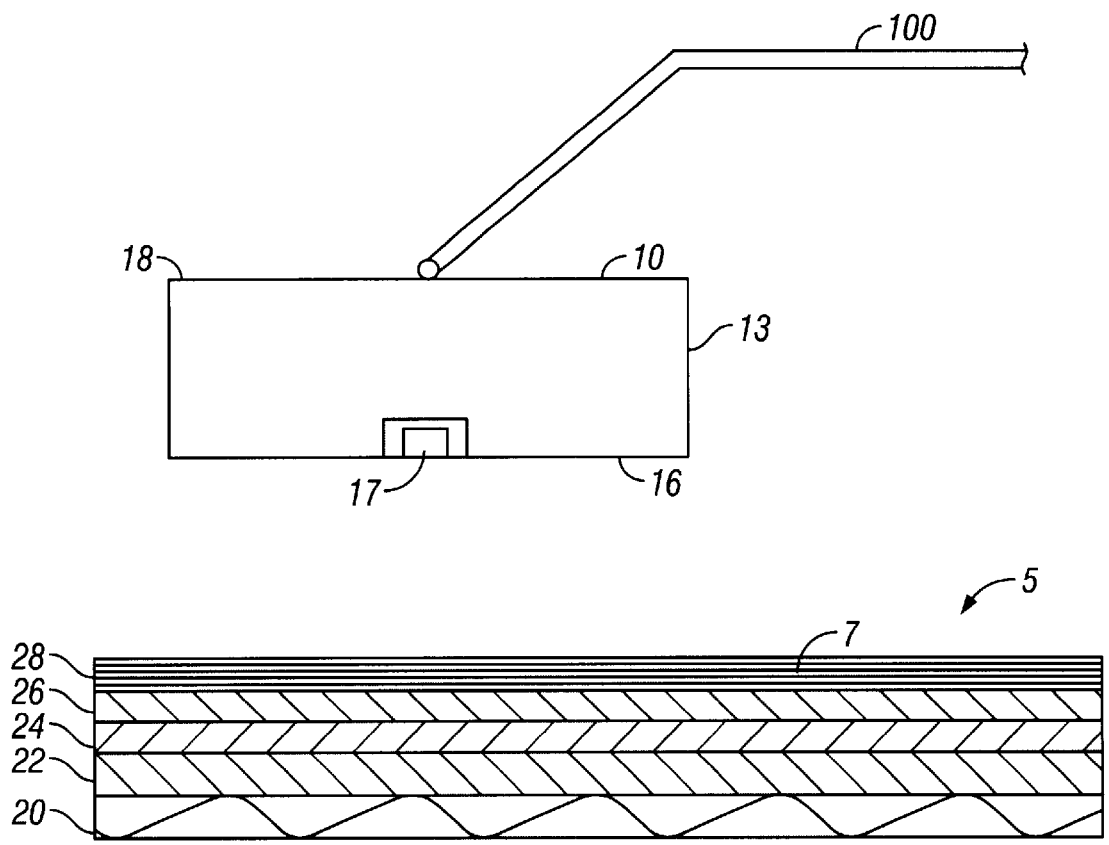
FIG. 1 is a schematic diagram of a data storage device including a magnetic head and a magnetic storage medium in accordance with a preferred embodiment.

FIG. 1 is a schematic diagram of a portion of a data storage system 1 that includes a magnetic recording medium 5, such as a magnetic disk, and a magnetic head 10. The data storage system 1 may be, for example, a disk drive. Magnetic head 10 may be an inductive head or a magneto-resistive head. Magnetic head 10 applies magnetic fields to the medium 5 to record data. Also, magnetic head 10 detects magnetic fields from the medium 5 to reproduce data.

The medium 5 includes a substrate 20. Substrate 20 may include an underlayer film 22, a magnetic film 24, and a protection film 26 that are formed onto substrate 20 in a conventional manner. Layers 22, 24, and 26 are optional and may be formed in any combination on substrate 20. Preferably, layers 22, 24, and 26 form a layer of dielectric material 28 on medium 5, as discussed below. Medium 5 also includes a plurality of data tracks 7 that are formed on the medium surface in a conventional manner.

During operation, the medium 5 is rotated at a suitable speed for recording or reproducing bits of information onto one of the data layers 7 of medium 5. Suitable speeds may be about 4500 rpm. As the medium spins, the magnetic head 10 is moved relative to the medium 5 by, for example, a load arm 100.

The magnetic head 10 includes a slider 13 that supports a transducer assembly 17. The transducer assembly 17 is configured to read and write information to and from data tracks 7.

Slider 13 includes an air bearing surface 16 and a top surface 18. The air bearing surface may be "negative pressure slider". In this configuration, a recessed portion (not shown) is formed on air bearing surface 16. As air flows between the medium 5 and head 10, a negative lift force is formed towards the surface of the medium that partially counters the aerodynamic lift force describe above. This results because air passing on the air bearing surface 16 expands. Preferably, the slider 13 is formed from a ceramic material. Slider 13 may be formed from a dielectric material. Suitable materials include alumina and titanium. Slider 13 may also include a carbon overcoat (not shown). The carbon overcoat may be a diamond-like carbon that is employed to protect components of the head 10.

One aspect described herein is to control the fly height of head 10 by applying a voltage at the interface between the head 10 and medium 5. In a preferred embodiment, the interface is configured as a variable capacitor such that the head 10 and medium 5 are opposing terminals. The head 10 and the medium 5 are separated by an air gap, i.e., the distance between the head 10 and the medium 5. The flying height is determined in such a way that the applied voltage can reduce or increase the vertical movement of head 10, and thus, the height of the air gap.

Figure 2:
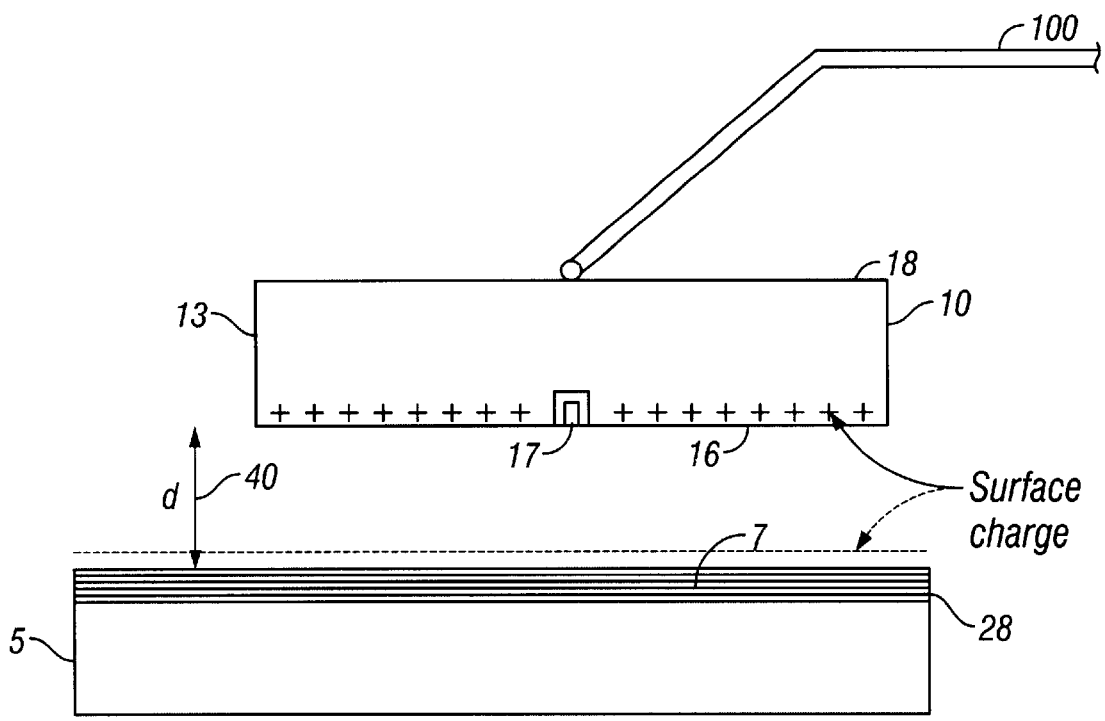
FIG. 2 is a schematic diagram of an interface between the magnetic head and the storage medium of FIG. 1.

FIG. 2 is a schematic showing the head 10 and medium 5 separated by an air gap 40. In this configuration, the magnetic head 10 can be modeled to have a positive surface charge, and the medium 5 may have a negative surface charge. Alternatively, the head 10 may have a negative surface charge, and the medium 5 may have a positive surface charge. The surface charges may be controlled by varying the polarity of an applied voltage ("V") at an interface between head 10 and medium 5. This is because of the varying properties of the head 10 and medium 5 such as the magnetic field surrounding the head 10 and medium 5, respectively.

Assume a configuration that includes the head 10, the medium 5, and dielectric layer 28 on the surface of the medium 5, can be characterized as a quasi-parallel capacitor. The capacitor may then be characterized by:

$$C=Q/V=\in\in_r A/d \tag{1}$$

where d is the height of the air gap 40, A is the surface area of the air bearing surface 16 of slider 13, and $\in$ and $\in_r$ are the absolute and relative permittivity of the dielectric layer 28 (i.e., surfaces 22, 24, and 26).

The attraction force between the head 10 and the medium 5 may then be characterized by:

$$F=-\tfrac{1}{2}\in\in_r AV^2/d^2 \tag{2}$$

where V is the applied voltage.

As the voltage V increases, the air gap d is reduced in order to maintain a constant attraction force between head 10 and medium 5. Conversely, as the voltage V decreases, the air gap d is increased. This means that the applied voltage can be varied to increase or decrease the air gap d, and thus, the flying height of head 10.

In a preferred embodiment, the voltage V may be a DC or an AC voltage. The voltage V may be negative or positive, and may be between 0 and 20 volts.

Figure 3:
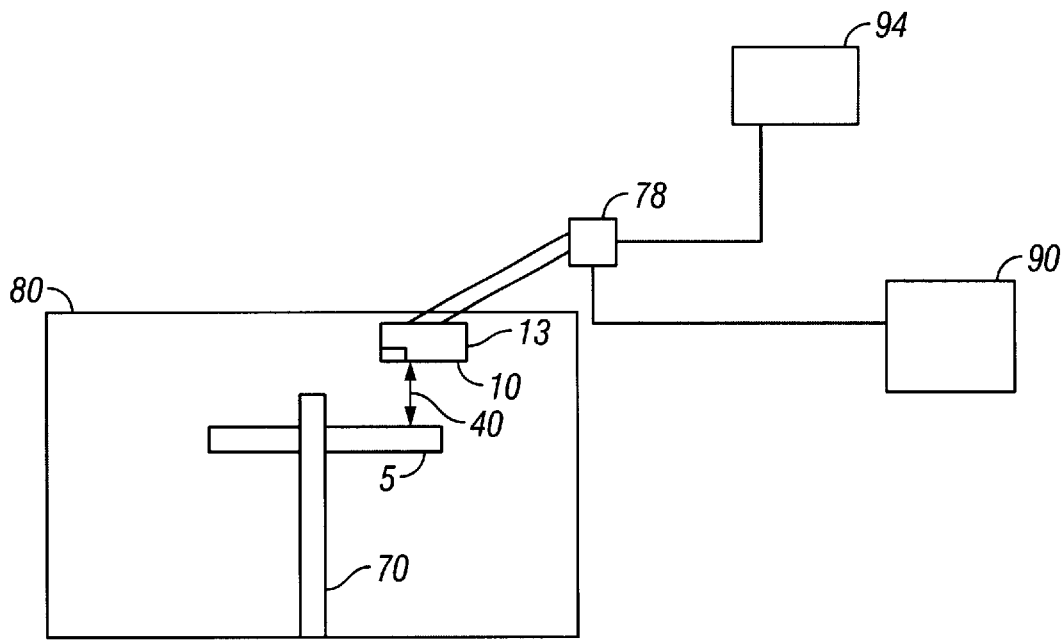
FIG. 3 illustrates a testing assembly to generate test data of FIGS. 4–11, below.

FIGS. 4–12 graphically illustrate various test data that was generated in accordance with the preferred method. A suitable testing assembly 60 is shown in FIG. 3.

In this configuration, medium 5 was rotated around a spindle 70 at about 4500 rpm. Head 10 was a conventional inductive head with a negative air pressure design, commonly available from Seagate™ Technology. The slider 13 was formed from $Al_2O_3$—TiC. The head 10 was coupled to load arm 100 to position head 10 over medium 5, as described above.

A sensor 78, such as an acoustic emission ("AE") sensor, was coupled to the arm 100 to measure contact between the medium 5 and head 10. In this operating regime, an increase in the output of the sensor 78 indicated increased contact between head 10 and medium 5. This means that the flying height of the head 10 and medium 5 was reduced. Accordingly, the air gap 40 was also reduced. The arm 100 was mounted to and insulated from an E-block 80. A voltage source 90 was electrically coupled to the interface between the head 10 and the medium 5 via arm 100 to supply a voltage to the interface. The testing was performed at ambient conditions.

In this example, a medium 5 having a surface texture was used. The configuration of the surface texture was a plurality of laser bumps (not shown) formed on the surface of the medium 5 at the landing zone in a conventional manner. The medium 5 had a resistance of about $10^9$ Ωm. It should be noted the resistance of medium 5 may vary up to about $10^{12}$ Ωm and as low as a few ohms.

An AC voltage in the form of a sine wave was supplied to the interface between head 10 and medium 5 by voltage source 90. A suitable voltage source 90 may be supplied by a signal generator that is commonly available from Goldstar™. When the AC voltage was supplied, the AE sensor 78 measured the contact at the head and medium interface and thus, the change in flying height, as described above. It was found that the air gap 40 decreased as the voltage increased, as described below.

To determine when contact between the head 10 and medium 5 occurred, the output signal from the AE sensor 78 was amplified to generate an AE raw signal (i.e., a non-filtered AE signal) and an AE RMS modulation signal (i.e., an AE signal filtered by means of a root mean square). In this example, the AE raw signal and the AE RMS modulation signal were generated by an oscilloscope 94 (FIG. 3) commonly available from Tektronix™. The AE raw signal was subjected to a Fast-Fourier Transform ("FFT") in a conventional manner to form a FFT spectrum. Using the FFT spectrum, it was found that contact between the head 10 and the medium 5 occurred between 700–1000 KHz. Alternatively, the contact could be measured by monitoring the intensity of the AE RMS signal.

Figure 4A:
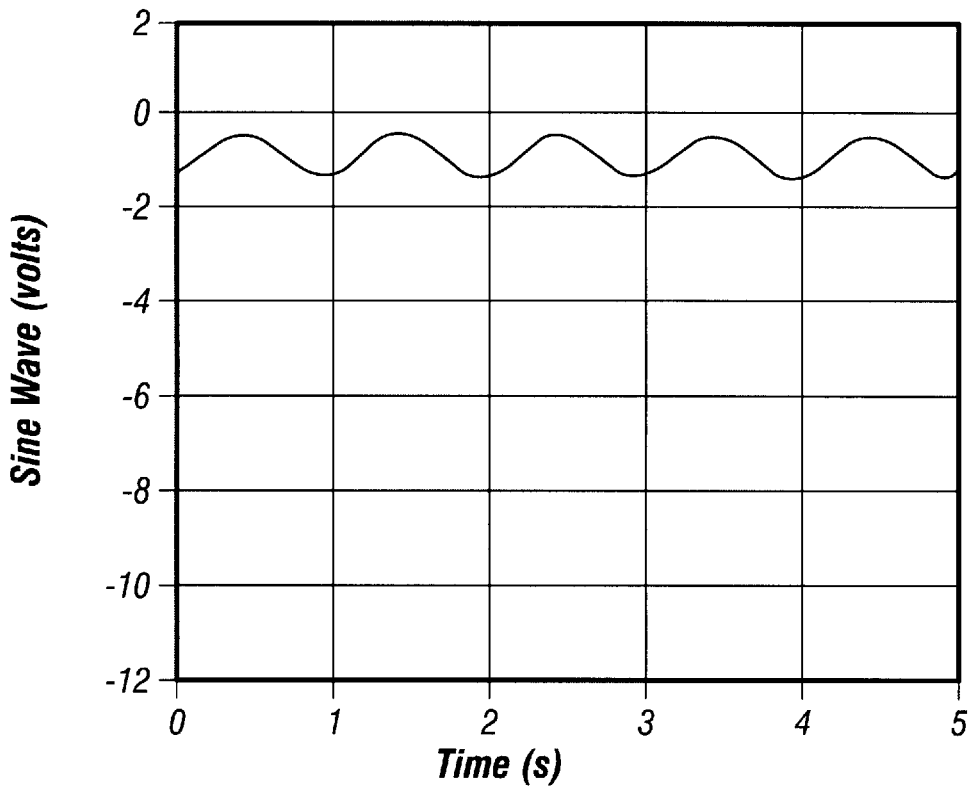
FIGS. 4A–4D graphically illustrate a relationship for contact at the interface between the head and the medium for an applied AC voltage of 1.4 volts.
Figure 4B:
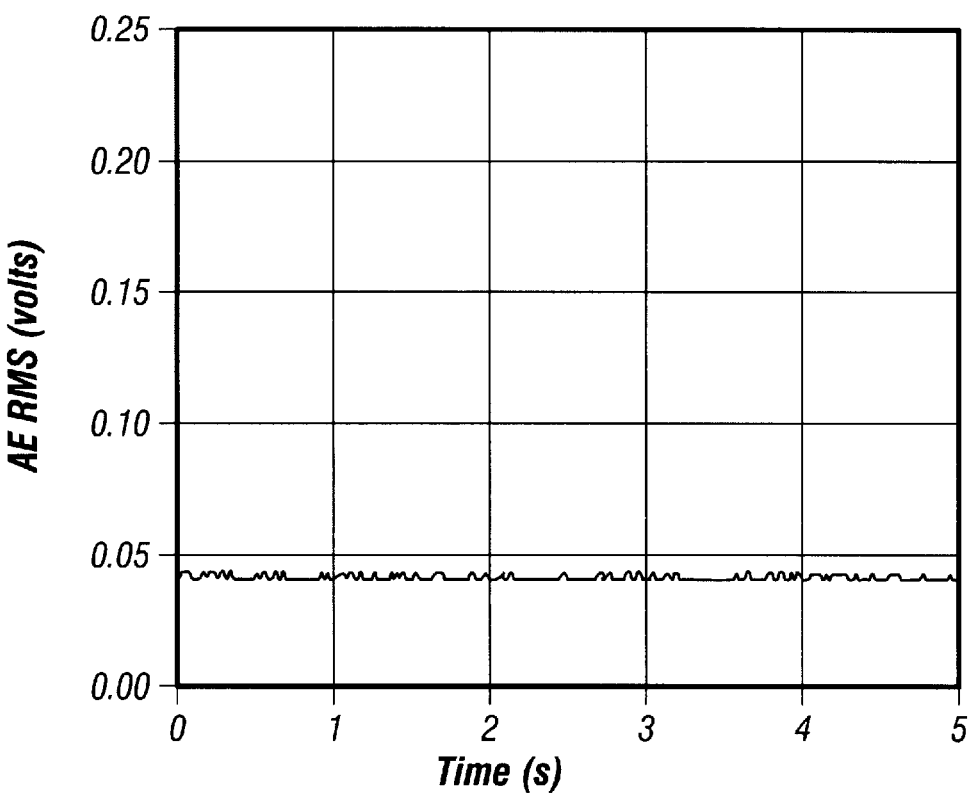
Figure 4C:
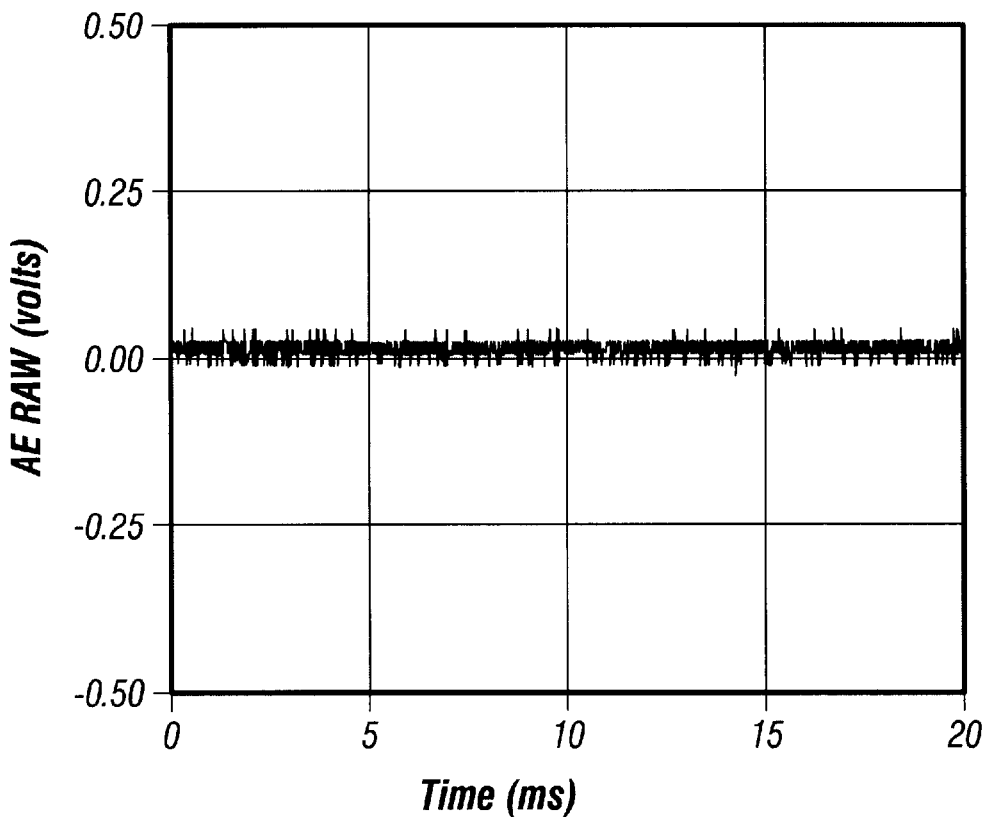
Figure 4D:
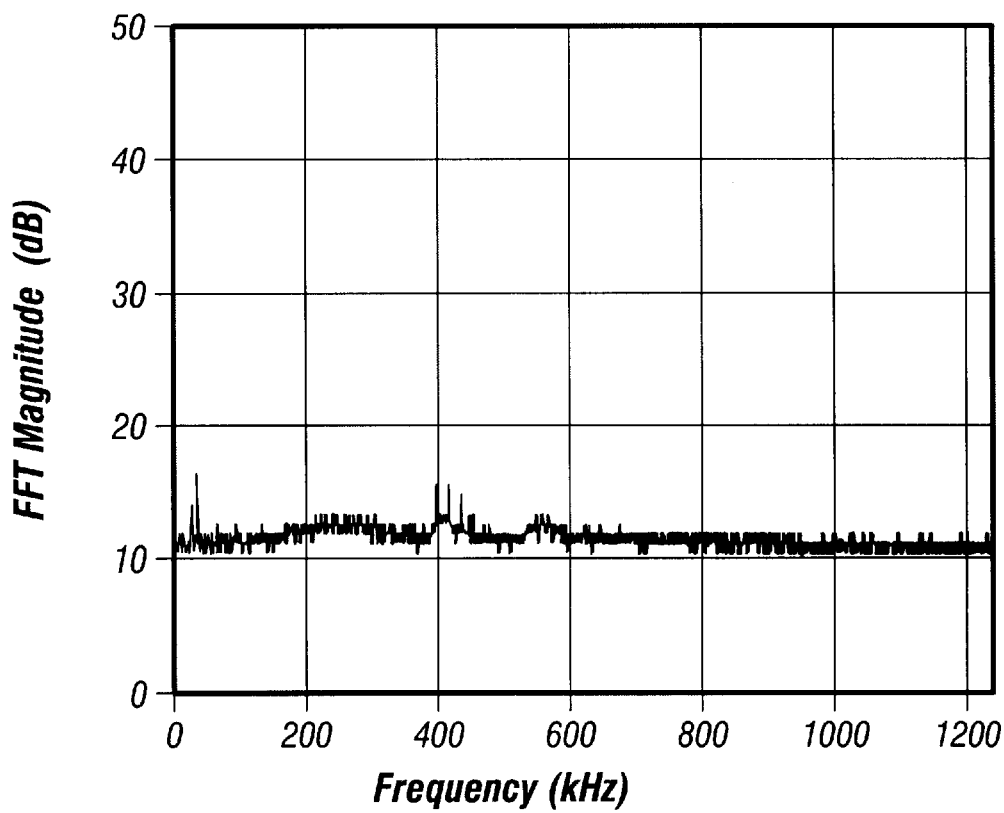
Figure 5A:
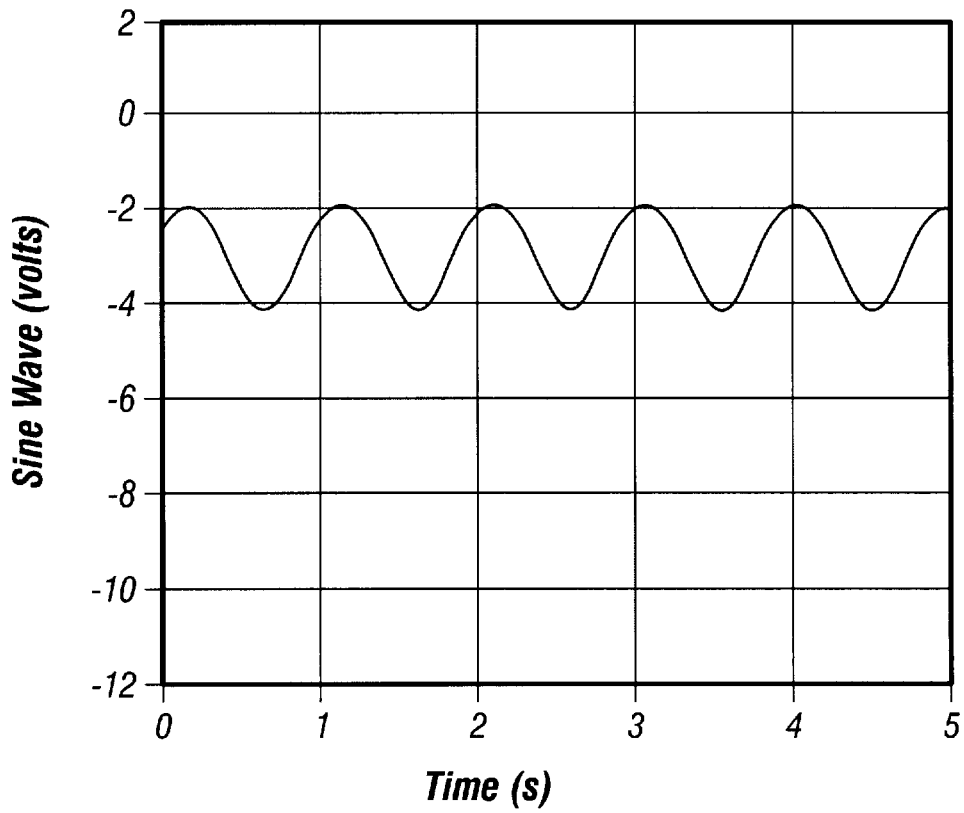
FIGS. 5A–5D graphically illustrate a relationship for contact at the interface between the head and the medium for an applied AC voltage of 2 volts.
Figure 5B:
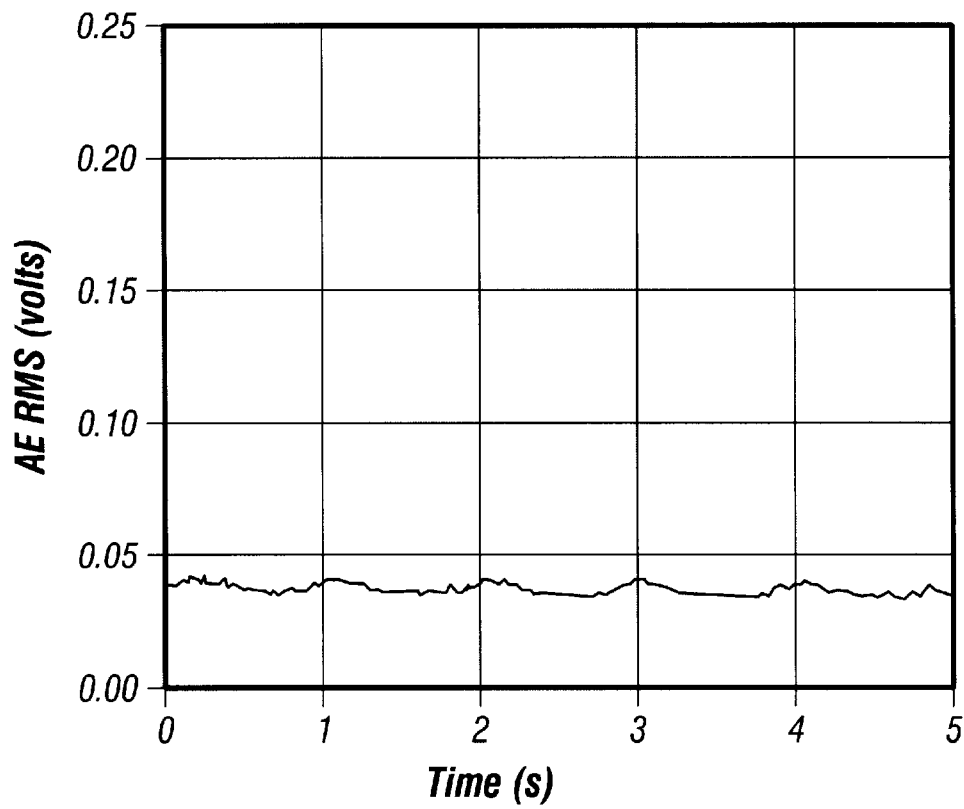
Figure 5C:
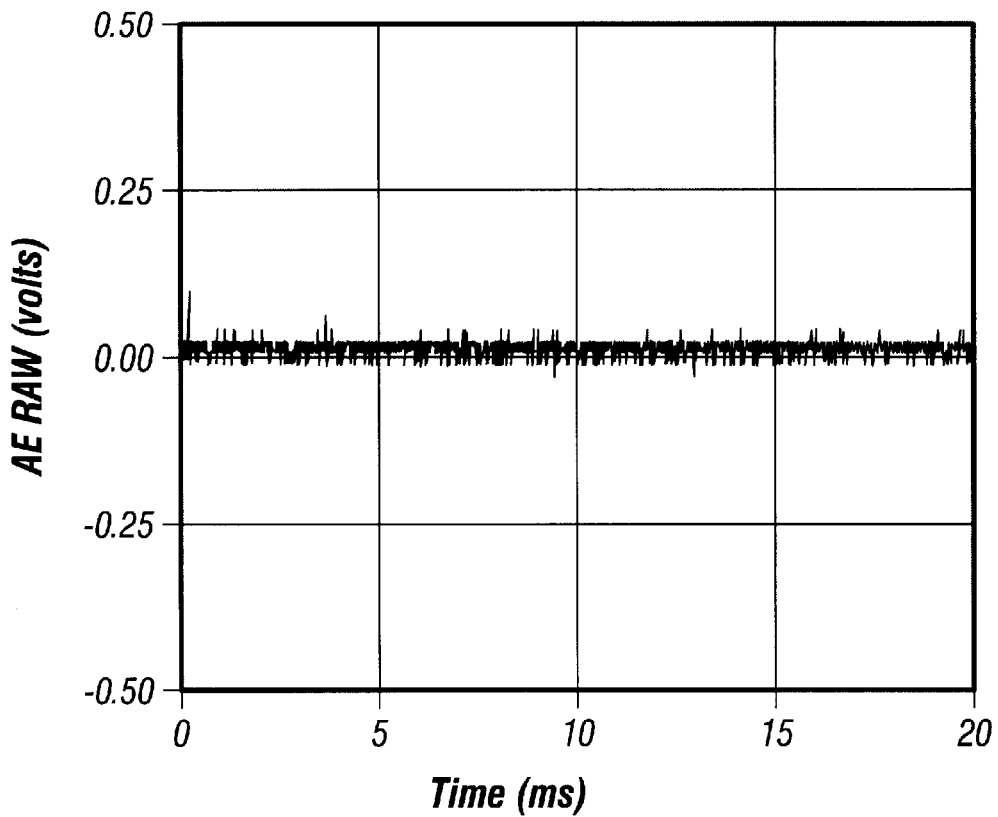
Figure 5D:
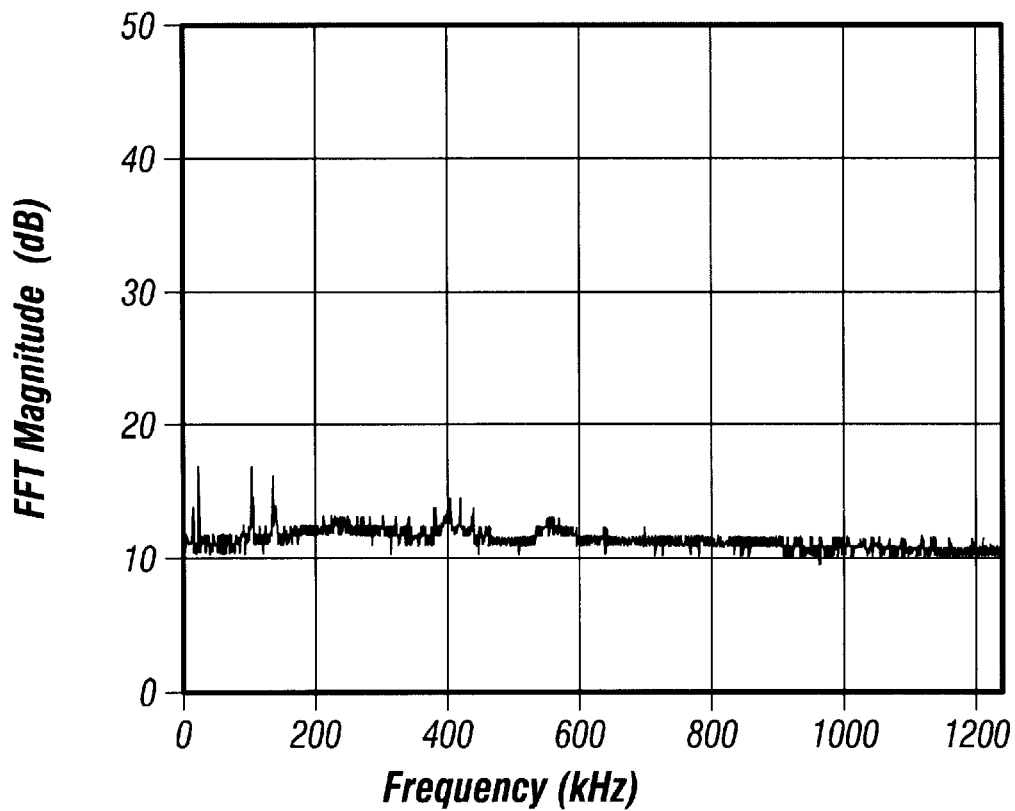

FIGS. 4A–4D graphically illustrate the relationship between the applied AC voltage from source 90 and the output signal of the AE sensor 78. For example, FIG. 4B illustrates the AE RMS signal for an applied AC voltage of 1.4 volts (FIG. 4A). FIGS. 4C and 4D show the AE raw and FFT signals, respectively. At this stage, the intensity of the AE RMS signal was low, and the FFT signal (FIG. 4D) was minimal. This means that no contact had occurred between the head 10 and the medium 5.

For an AC voltage of 2 volts (FIG. 5A), a weak modulation on the AE RMS signal was observed. (FIG. 5B) This was accompanied by an increase of the intensity of the FFT (FIG. 5D) and the AE raw (FIG. 5C) signals. At this stage, there was no contact between the head 10 and the medium 5.

Figure 6A:
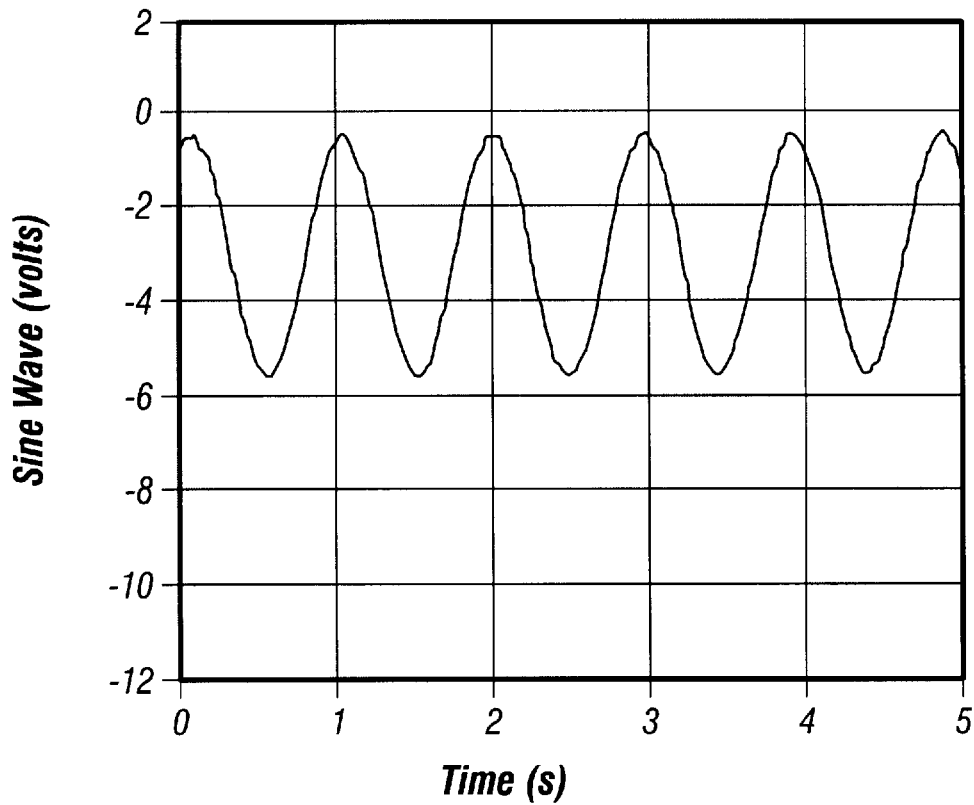
FIGS. 6A–6D graphically illustrate a relationship for contact at the interface between the head and the medium for an applied AC voltage of 5 volts.
Figure 6B:
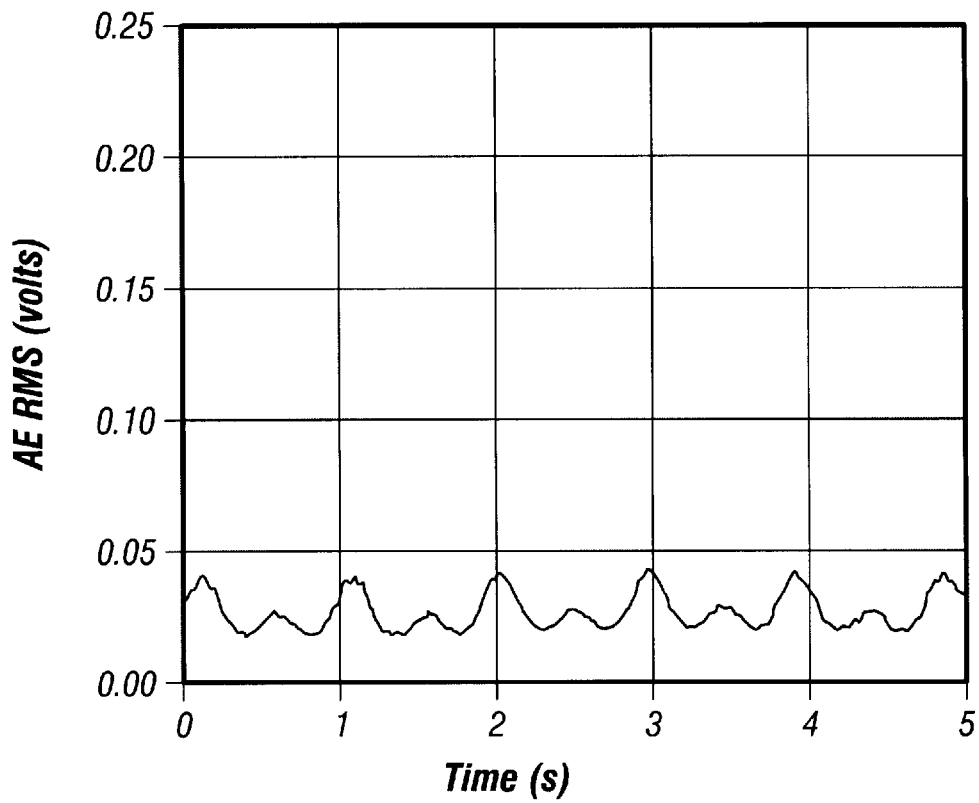
Figure 6C:
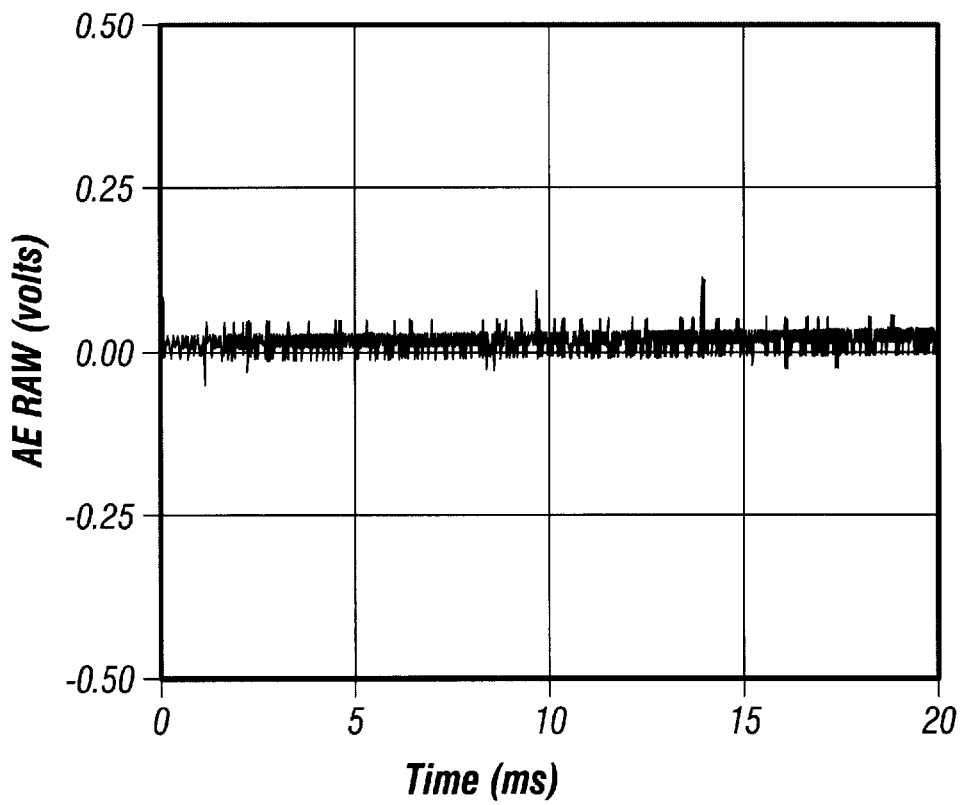
Figure 6D:
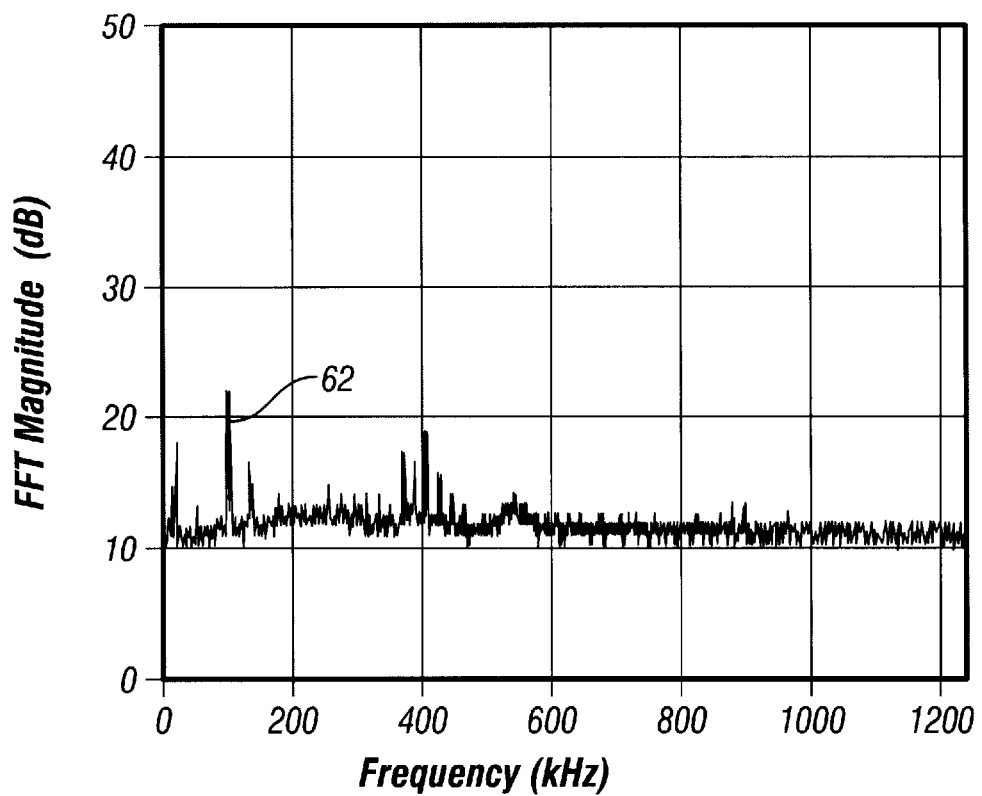

As shown in FIGS. 6A–6D, the AE RMS modulation (FIG. 6B) and the FFT and AE raw signals (FIGS. 6C and 6D) increased with an increase of the applied AC voltage (FIG. 6A) to about 5 volts. At this point, minimal contact between the head 10 and medium 5 may have occurred as indicated by arrow 62 (FIG. 6D).

Figure 7A:
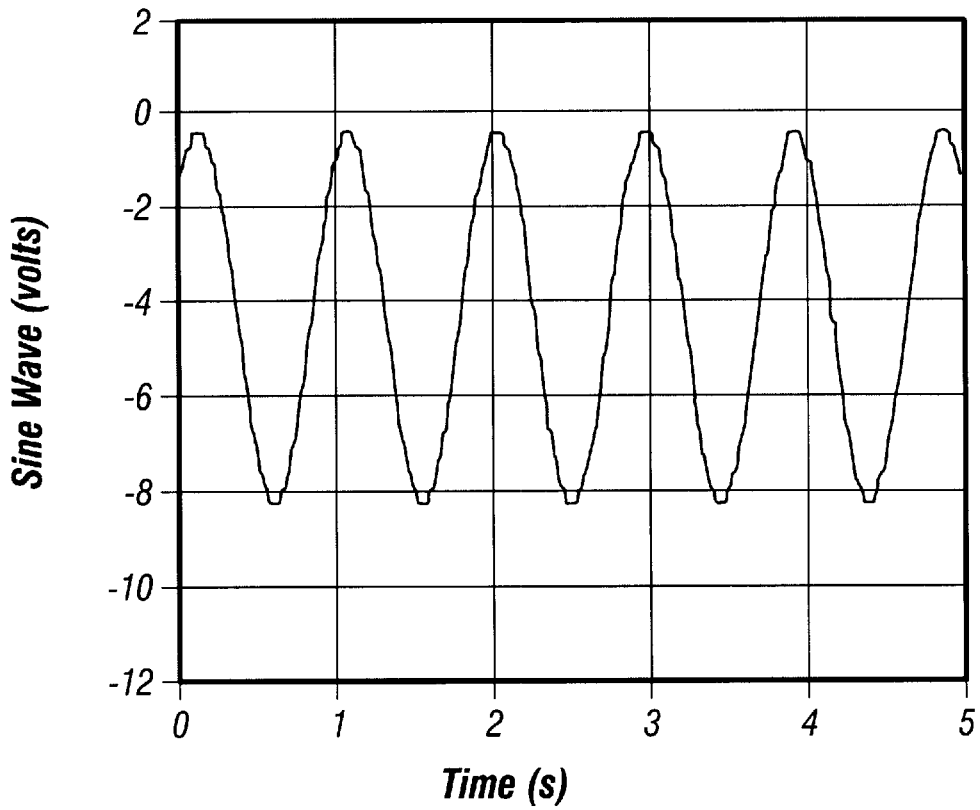
FIGS. 7A–7D graphically illustrate a relationship for contact at the interface between the head and the medium for an applied AC voltage of 8 volts.
Figure 7B:
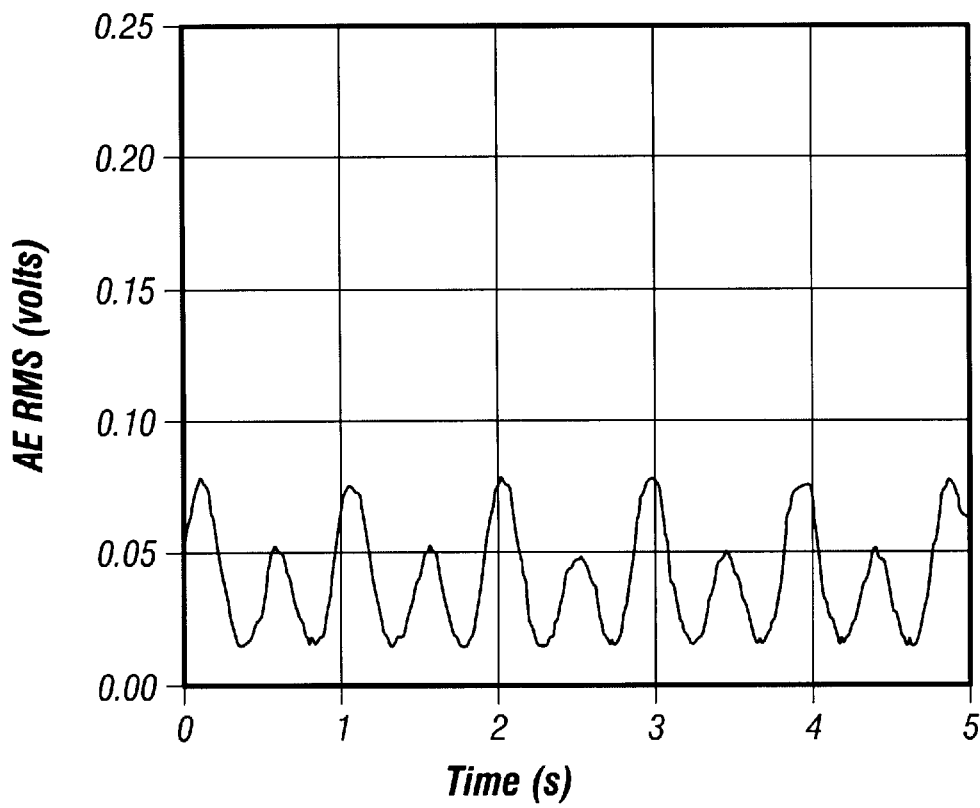
Figure 7C:
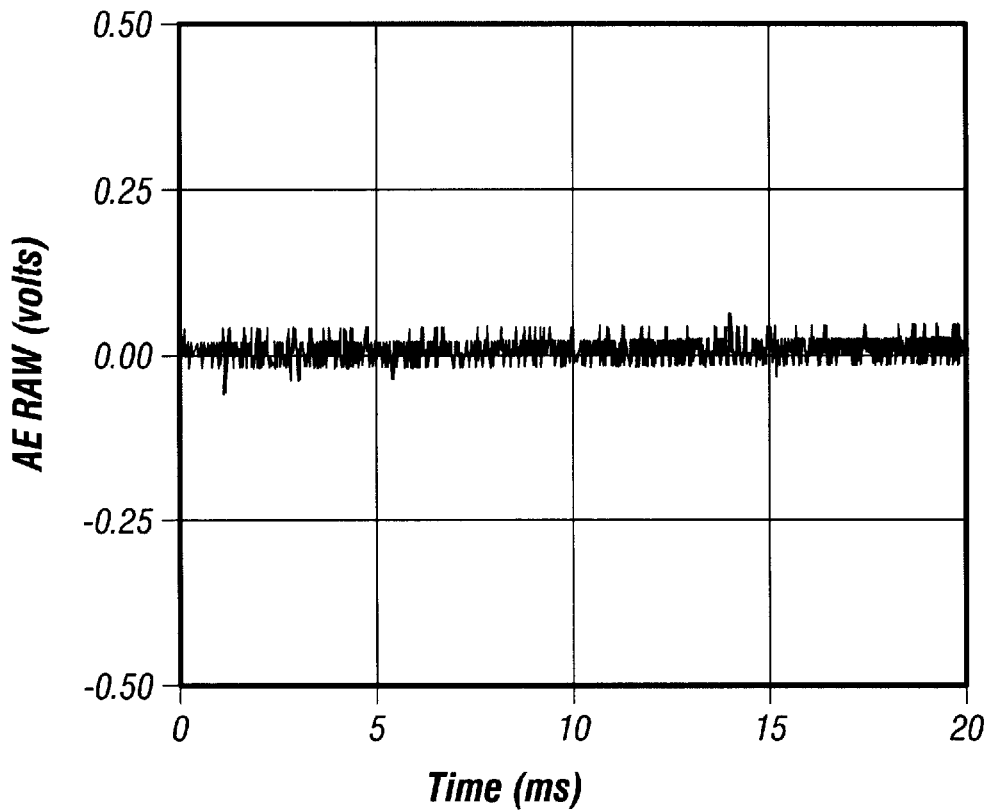
Figure 7D:
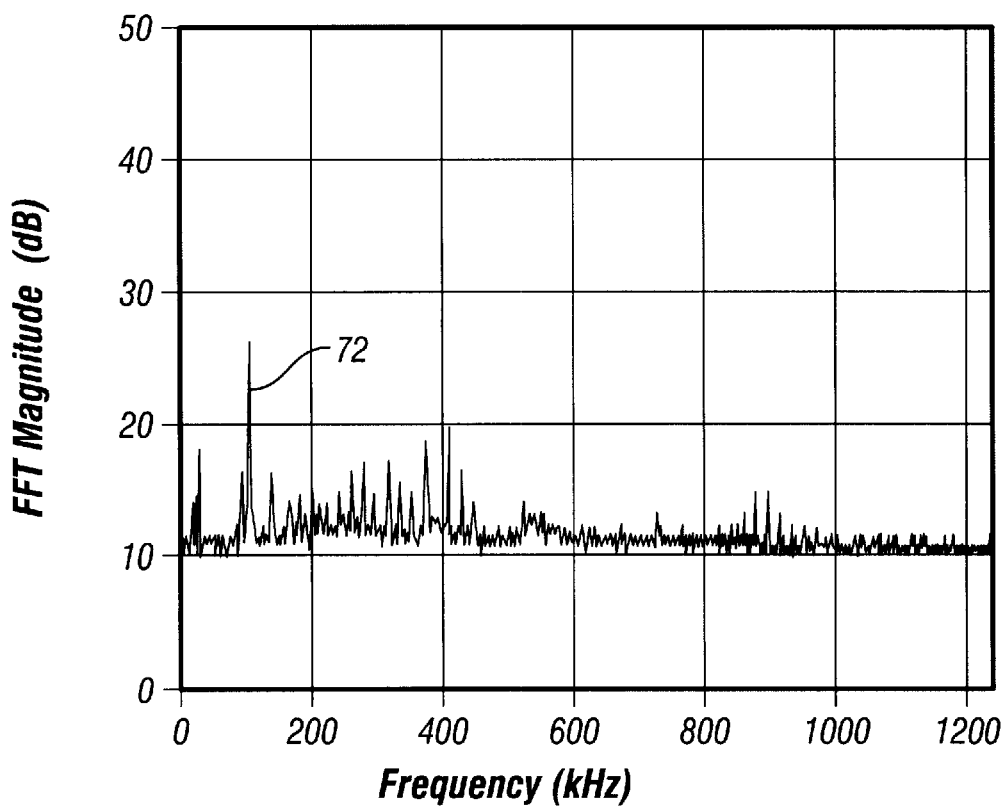

FIGS. 7A–7D show the AE RMS modulation (FIG. 7B) and the FFT and AE raw signals (FIGS. 7C and 7D) increased by increasing the applied AC voltage (FIG. 7A) to about 8 volts. In this case, contact between the head 10 and medium 5 was observed as indicated by arrow 72 (FIG. 7D).

Figure 8A:
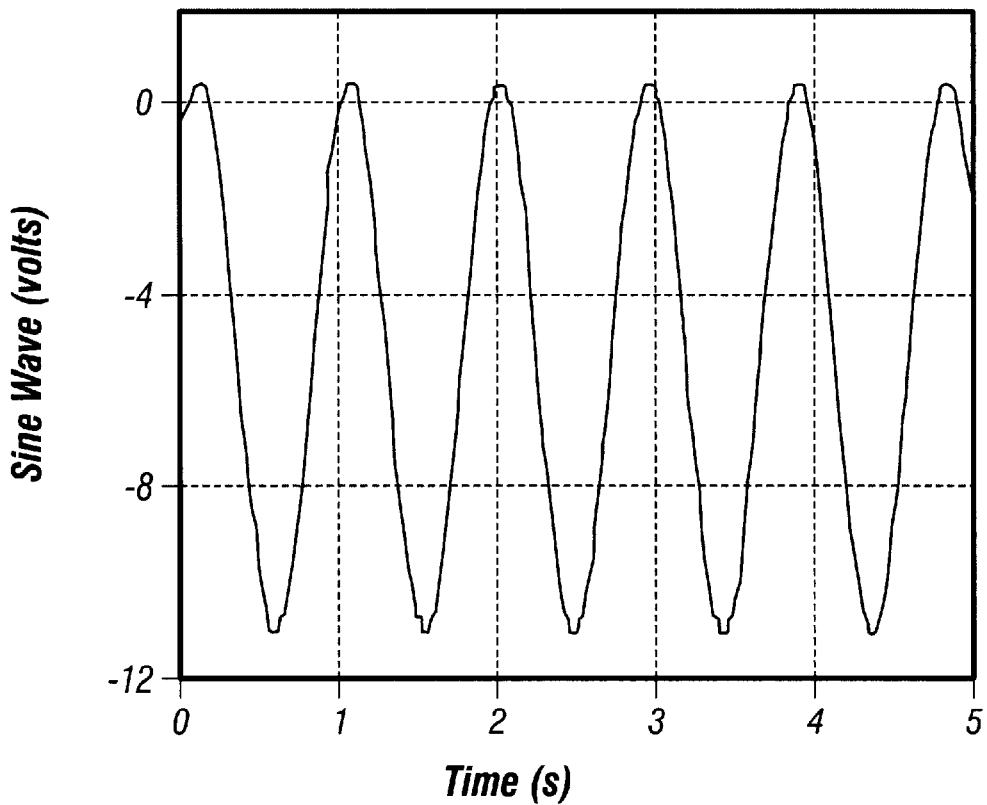
FIGS. 8A–8D graphically illustrate a relationship for contact at the interface between the head and the medium for an applied AC voltage of 11 volts.
Figure 8B:
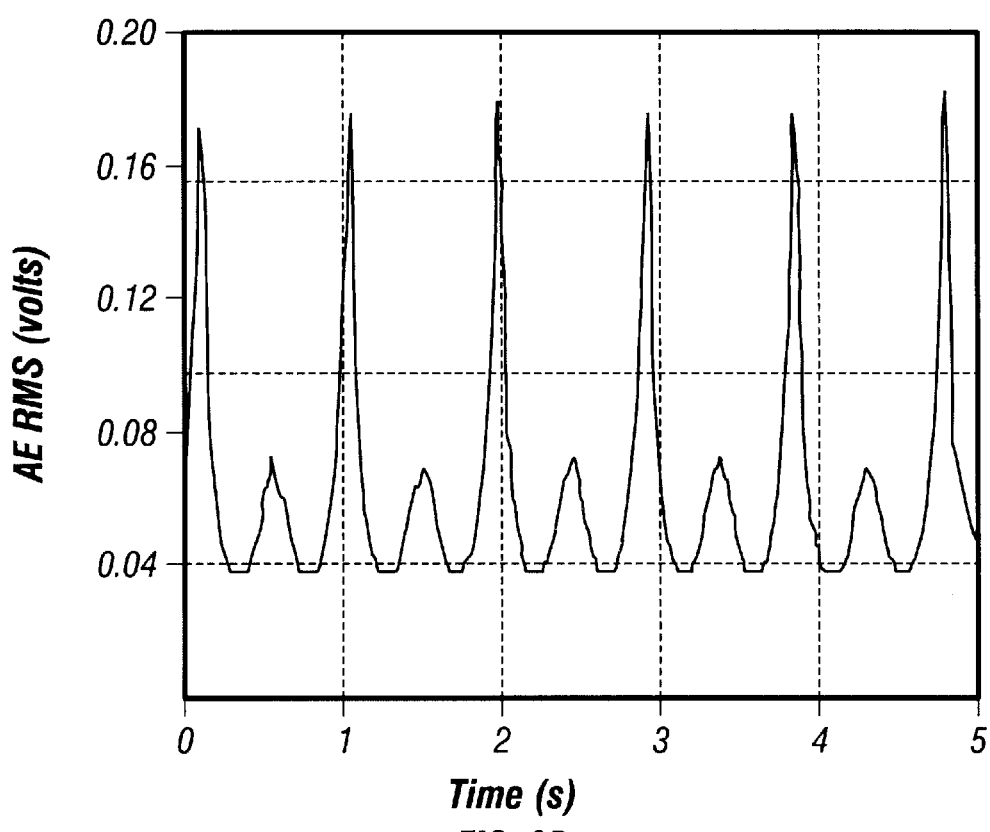
Figure 8C:
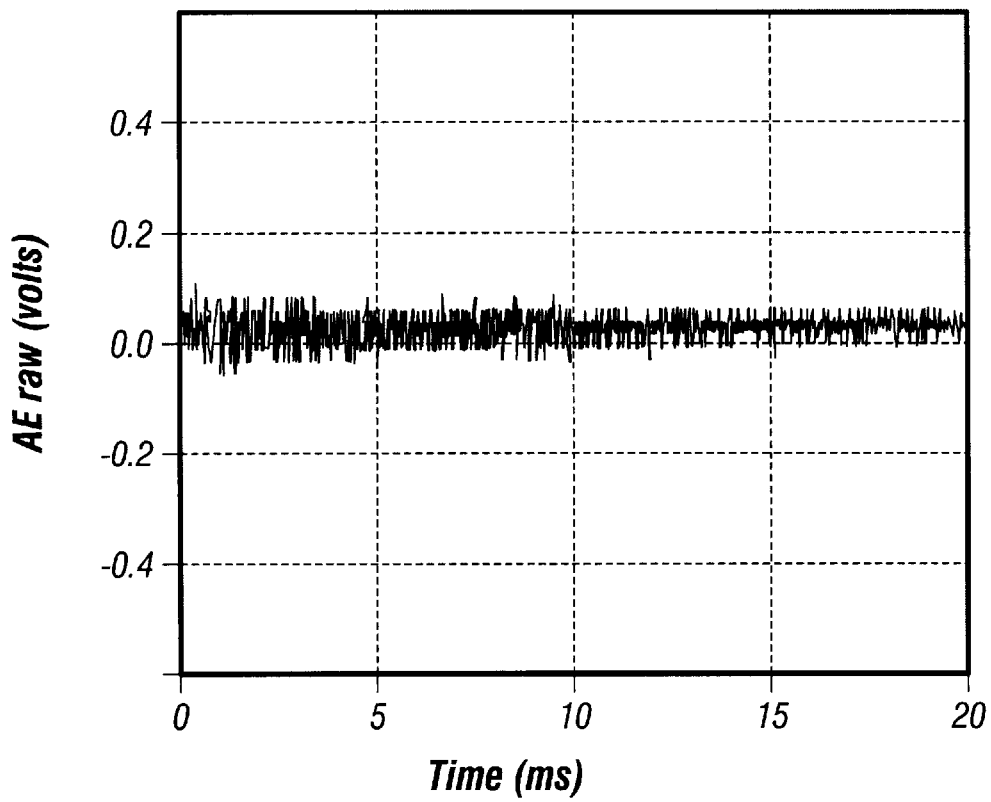
Figure 8D:
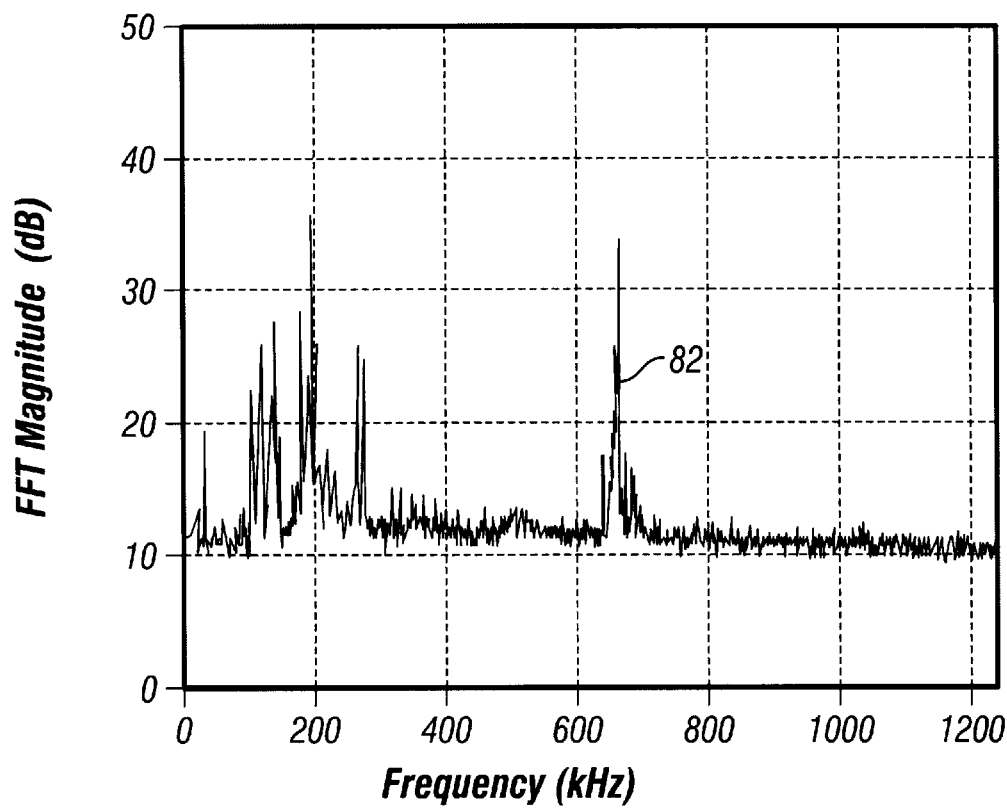
Figure 9A:
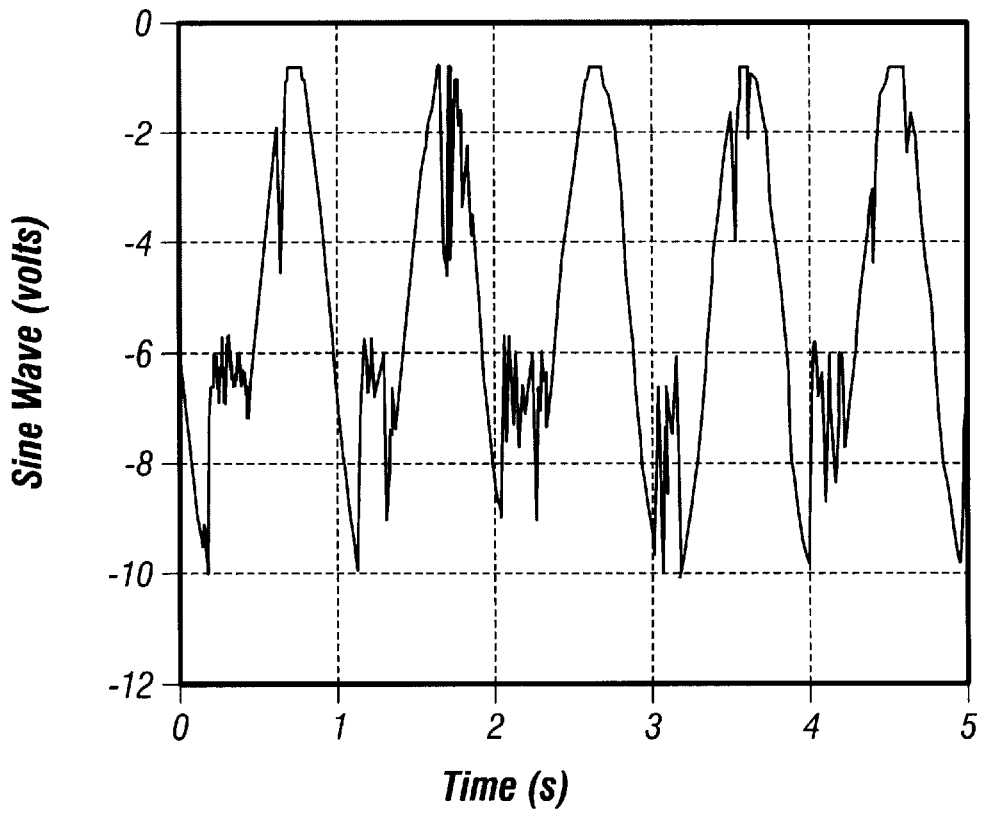
FIGS. 9A–9D graphically illustrate a relationship for contact at the interface between the head and the medium for a magnetic head failure.
Figure 9B:
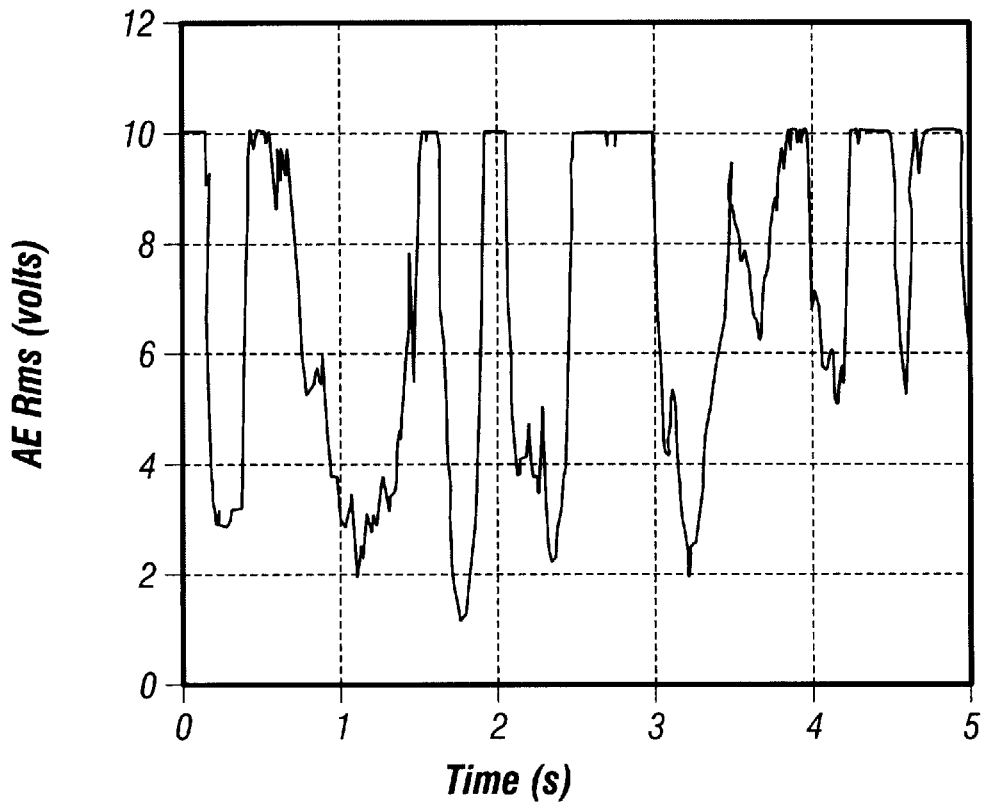
Figure 9C:
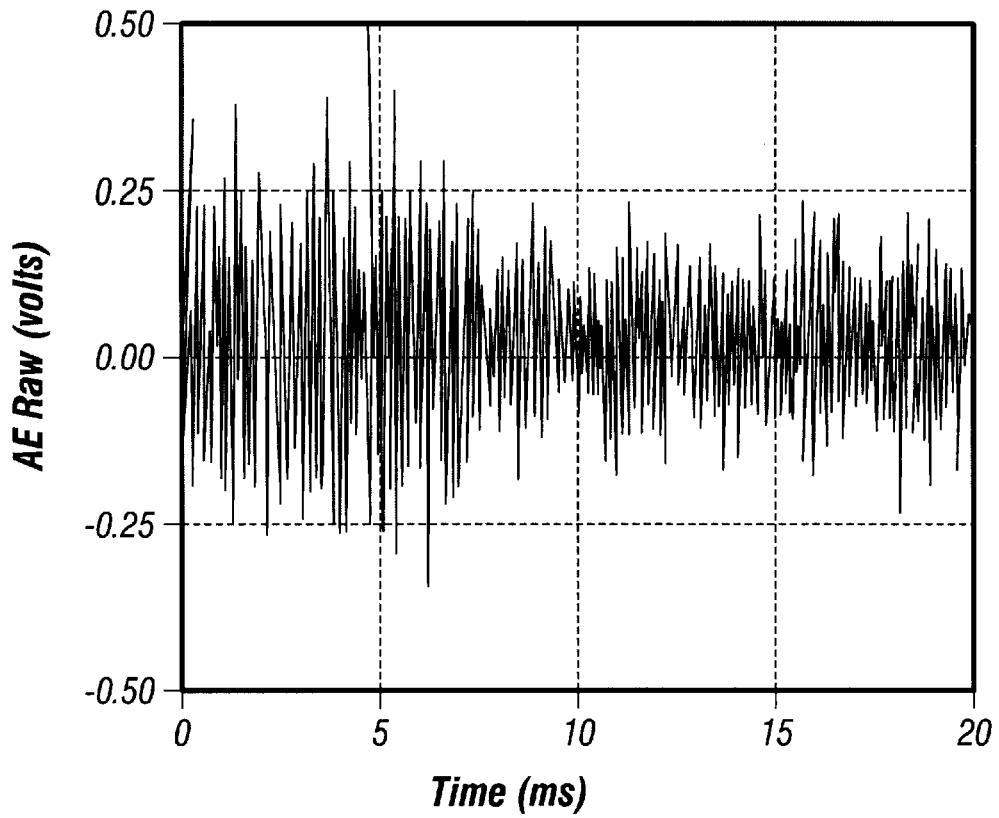
Figure 9D:
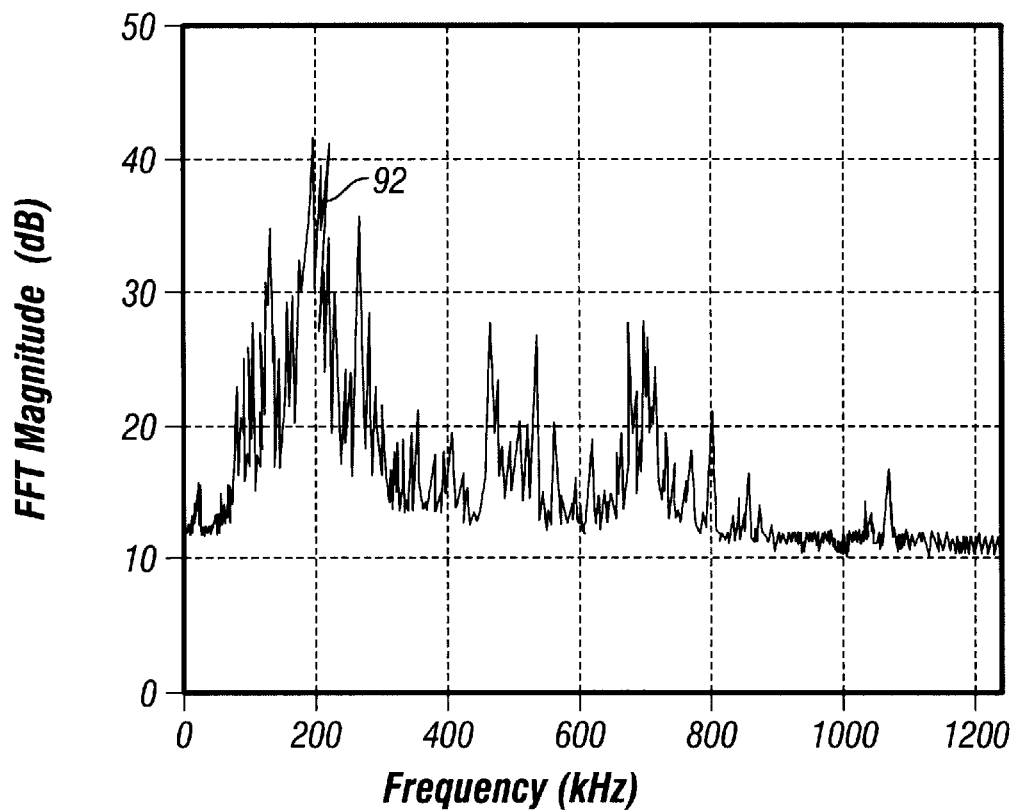

At about an applied AC voltage of 11 volts (FIG. 8A), the AE RMS modulation (FIG. 8B) increased to about 170 mV, and the FFT spectrum (FIG. 8D) increased to about 35 dB. This indicated that more severe contacts between the head 10 and medium 5 had occurred as indicated by arrow 82 (FIG. 8D).

FIGS. 9A–9D illustrate the AE RMS signal (FIG. 9B), the AE raw signal (FIG. 9C), and the FFT spectrum (FIG. 9C) after the head 10 failed (i.e., "head crash"). This resulted in a significant increase in the amplitude of the FFT spectrum signal as indicated by arrow 92. It was thus confirmed that the head 10 moved closer to the medium 5 for an increase in the applied voltage.

Figure 10:
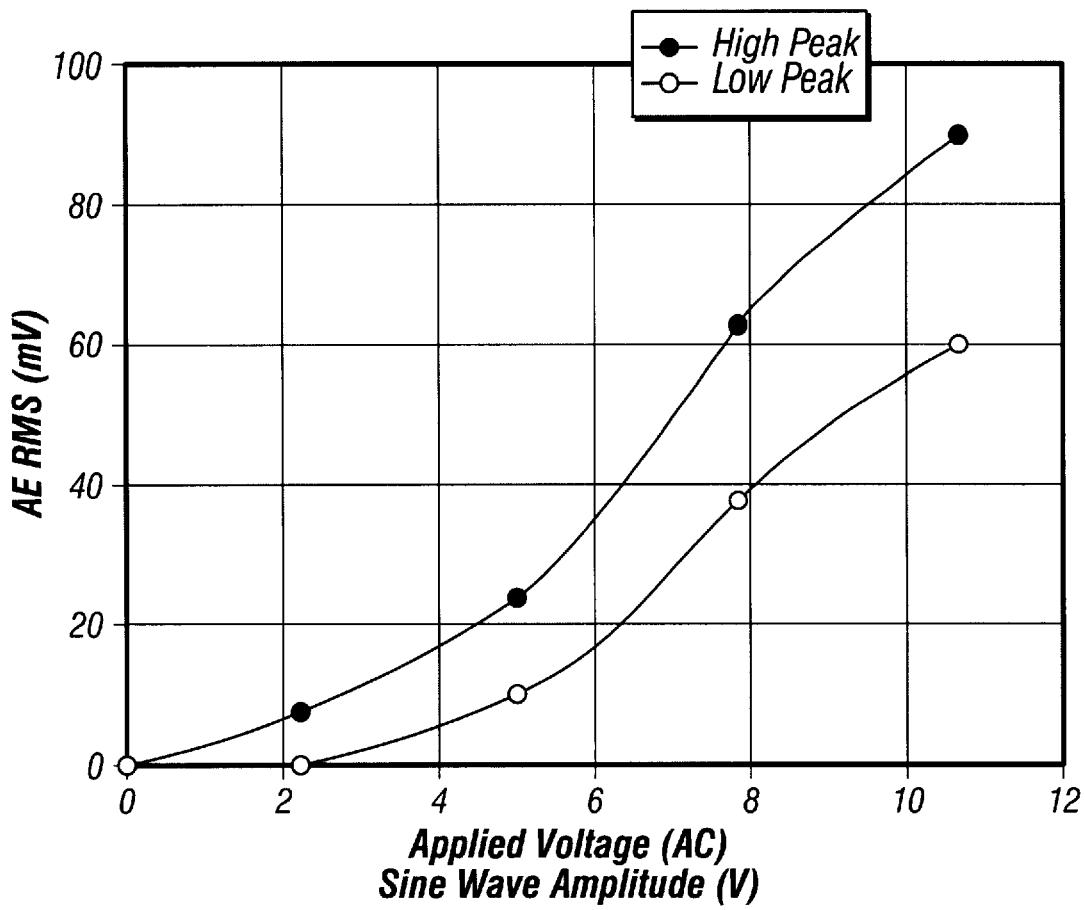
FIG. 10 graphically illustrates a relationship between the intensity of the contact between the head and the medium and the applied AC voltage.

FIG. 10 illustrates the relationship between the AE RMS modulation signal and the applied voltage. As the voltage increased, the AE RMS signal also increased. Accordingly, an increase in contact between the head 10 and medium 5 occurred. Therefore, the air gap 40 was reduced. This means that the flying height of the head 10 was decreased for an increase in voltage.

Figure 11:
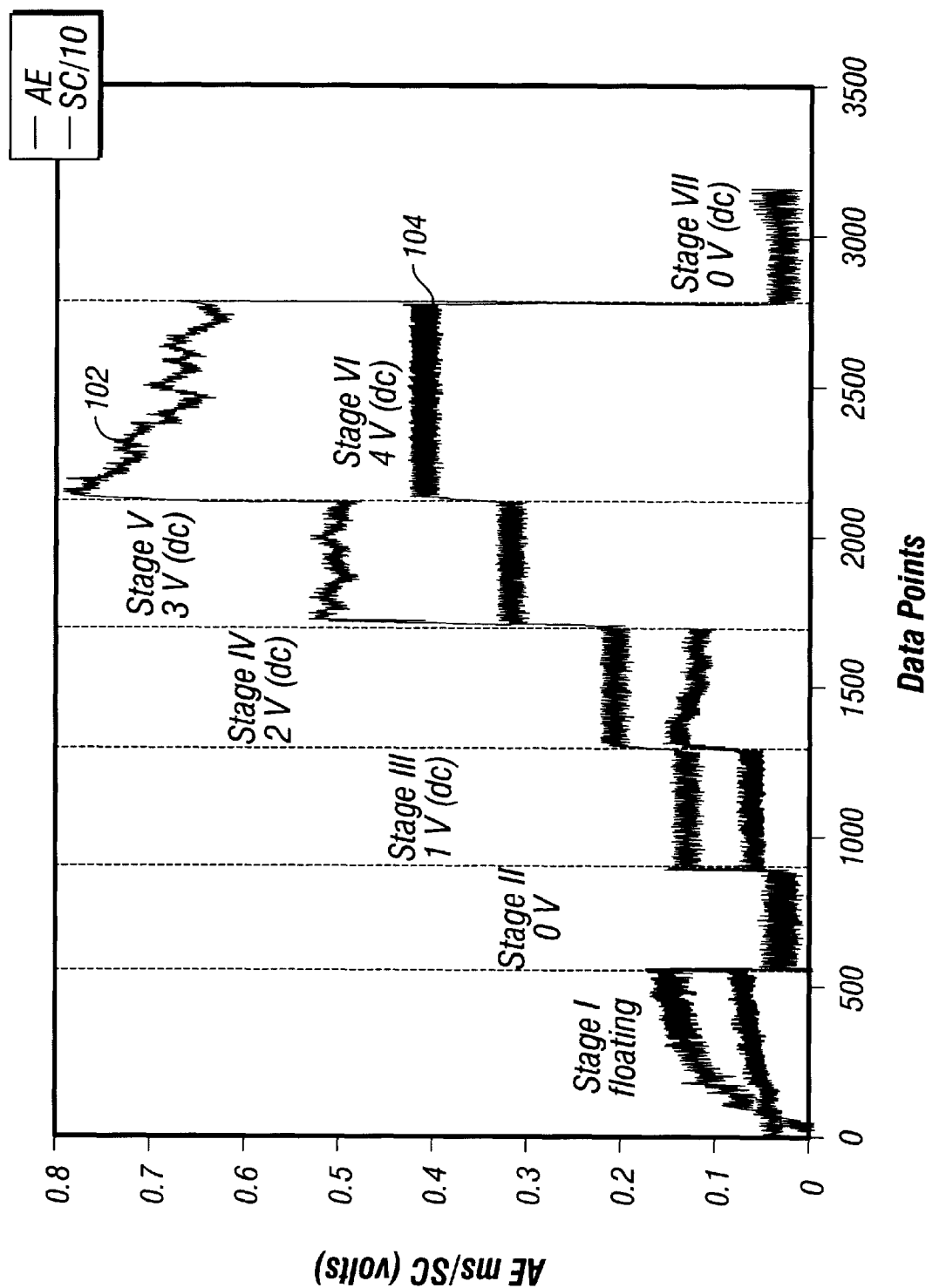
FIG. 11 graphically illustrates a relationship between the intensity of the contact between the head and the medium and an applied DC voltage.
Figure 12A:
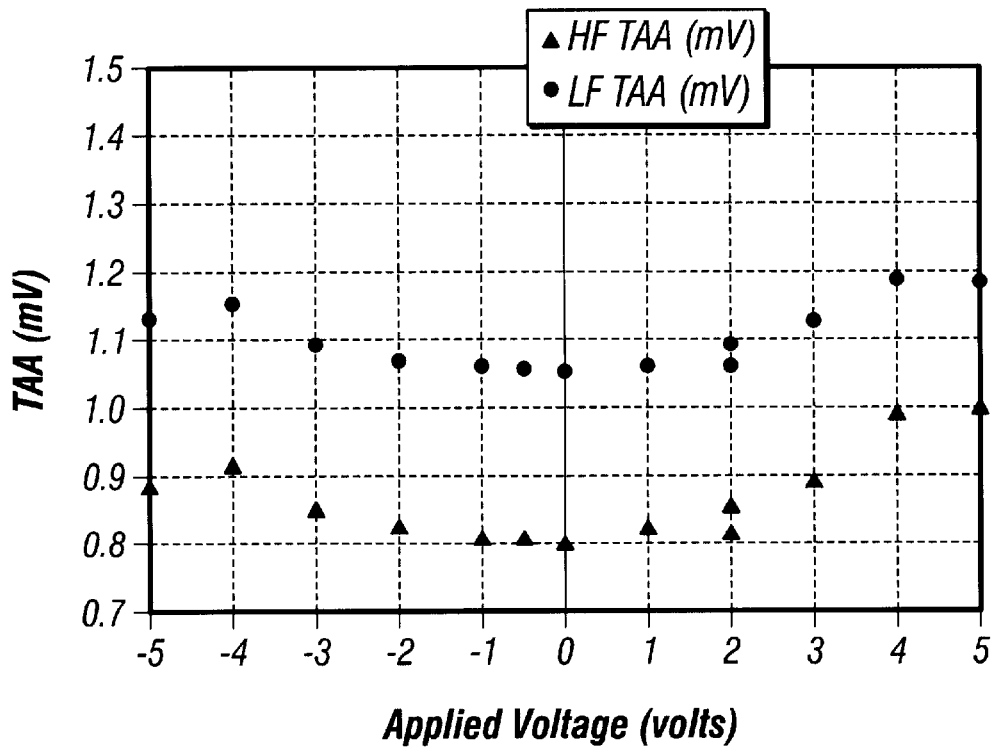
FIGS. 12A–12D graphically illustrates an alternative relationship between the contact between the head and the medium and an applied DC voltage.
Figure 12B:
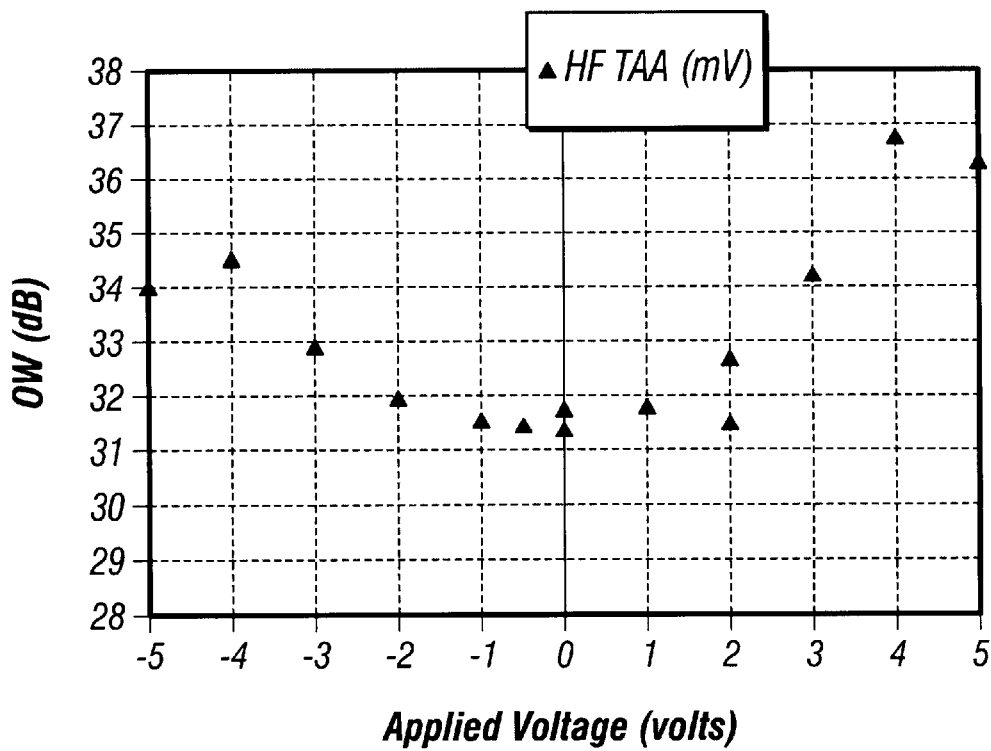
Figure 12C:
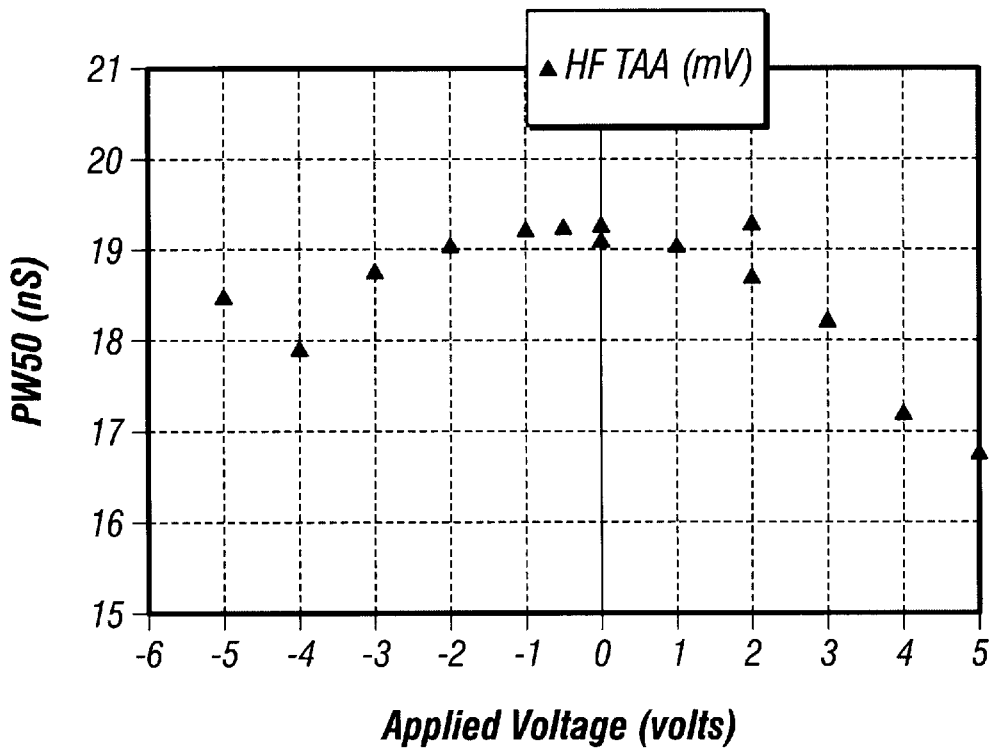
Figure 12D:
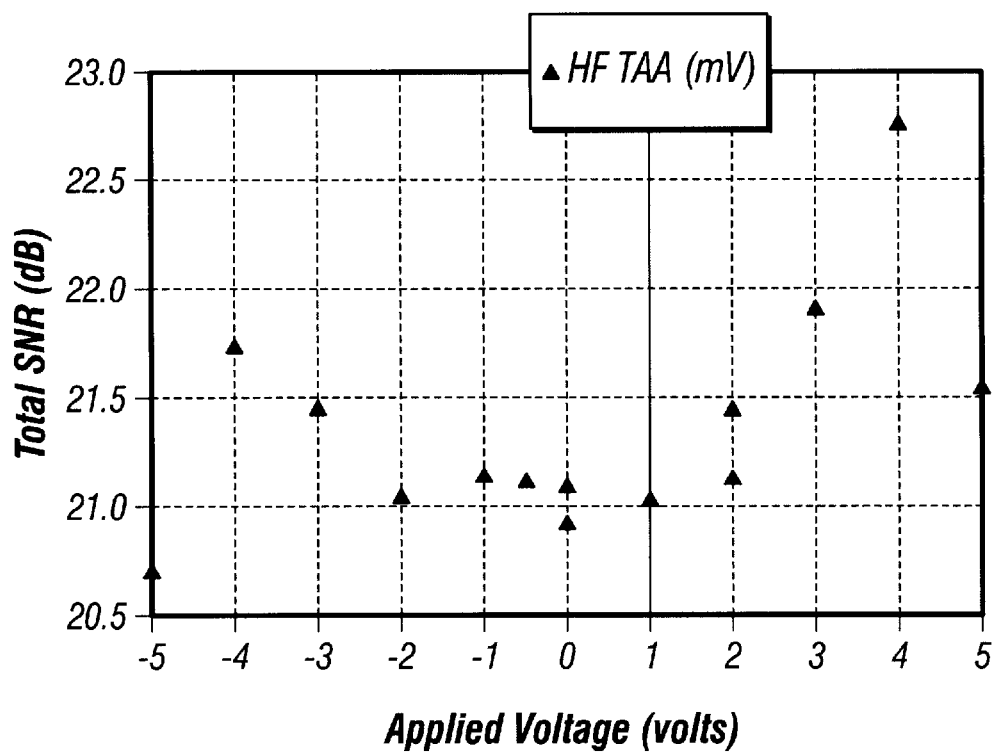

FIG. 11 graphically illustrates the AE RMS modulation 102 as a function of an applied DC voltage 104. At stages I and II, no contact was observed for an applied voltage of about 0 volts. At stages III–VI, the voltage was raised in increments of 1 volt. As shown, the intensity of the AE RMS signal increased, thereby indicating that contact between the head 10 and the medium 5 had occurred. Similar to the above case employing an applied AC voltage, the air gap 40, and thus the flying height of head 10 decreased with an increase in voltage. In the last stage, the voltage was decreased to 0 volts, and no AE RMS modulation was observed. Consequently, no contact between the head 10 and the medium 5 was observed. Thus, the flying height increased with a decrease in the applied voltage.

The above change in flying height was also confirmed as follows. The interface was subjected to different DC voltages. The parameters measured included track average amplitude (TAA), pulse width at half height (PW50), overwrite (OH), and total signal to noise ratio (SNR). FIGS. 12A–12D graphically illustrate the variation of these parameters for applied DC voltages from –5V to +5V.

In this example, the magnetic head 10 was a Seagate magneto-resistive (MR) head formed from 50% $AL_2O_3$—TiC slider, and had a negative pressure air bearing surface which was coated with diamond-like carbon. The medium 5 was a Seagate™ recording medium that was made of aluminum substrate. The substrate was then coated with NiP, a magnetic alloy, a carbon overcoat, and a lubricant layer of Perfloropolyether (PFPE) polymer.

As shown in FIG. 12, increasing the absolute value of the applied DC voltage resulted in an increase of TAA, OW, and the total SNR. Also, the PR50 decreased. It will be readily appreciated that the air gap 40 decreased as the absolute value of DC voltage was increased, as indicated by the measured parameters. Thus, the flying height was reduced for an increase of the applied DC voltage.

The preferred method allows the head 10 to travel relative to the medium 5 during operation by controlling the applied voltage. Accordingly, higher data densities may be achieved. Also, this means that when no contact is desired, the head 10 can be vertically shifted during head operation. Conversely, if head contact is desired, the head can be vertically shifted toward the medium 5. Additionally, head failure can be monitored as function of the applied voltage, as shown in FIGS. 9A–9D. Thus, when head failure occurs, the data storage system 1 can be stopped.

It is contemplated that the preferred method may be configured in "active" sliders. Active sliders are sliders that can change flying height as the head travels over the medium. In the preferred method, the flying height of the head may be increased to avoid contact between the head and the medium. Alternatively, the flying height of the head may be decreased to improve magnetic performance.

Further, the flying height of the head may be altered for different environmental conditions. For example, the head may be designed to fly higher at higher altitudes to compensate for the effects of thin air. Also, the flying height may be lowered to compensate for weak or degraded signals between the head and the medium.

Additionally, the head may be configured for controlled flying heights. For example, a constant fly height may be achieved by applying a stable DC voltage to the interface between the medium and the head. Also, variable flying heights may be achieved by applying an AC voltage having different amplitudes to the interface.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the amended claims and their equivalents.

What is claimed is:

1. A method for controlling a magnetic head spaced from a magnetic storage medium, comprising:

forming a dielectric layer on the storage medium;

applying a voltage to an interface between the storage medium and the head to vertically displace the head relative to the storage medium; and varying the polarity of the voltage applied to the interface.

2. The method of claim 1, wherein the applying step further comprises applying a DC voltage or an AC voltage to the interface.

3. The method of claim 1, wherein the forming step includes forming the dielectric layer from at least a magnetic layer.

4. The method of claim 1, further comprising vertically displacing the head relative to the storage medium to avoid contact between the head and the medium.

5. The method of claim 1, further comprising vertically displacing the head relative to the storage medium to increase the data density between the head and the medium.

6. The method of claim 1, further comprising minimizing a distance between the storage medium and the head in response to a degraded signal between the storage medium and the head.

7. The method of claim 1, wherein the applying the voltage further comprises applying the voltage to one of increase and decrease an air gap between the magnetic head the and the magnetic storage medium.

8. The method of claim 1 wherein the applying the voltage further comprises electrically coupling a voltage source to the head.

9. A data storage system, comprising:

a magnetic storage medium having a dielectric layer;

a magnetic head positioned relative to the storage medium; and a voltage source electrically coupled to the head to supply a voltage of varying polarity to an interface between the head and the medium to vertically move the head relative to the medium.

10. The data storage system of claim 9, wherein the supplied voltage is one of an AC and a DC voltage.

11. The data storage system of claim 9, wherein the storage medium further comprises a surface texture and the head is operable to vertically move to avoid contact between the head and the medium.

12. The data storage system of claim 9, wherein the head is operable to vertically move relative to the storage medium to increase the data density between the head and the medium.

13. The data storage system of claim 9, wherein the head comprises:

a slider having a first surface and a second surface;

an air bearing surface formed on the second surface; and a transducer assembly formed proximate the air bearing surface to read or write data to or from a plurality of data tracks on the medium.

14. A data storage system for reading or writing data to or from a magnetic storage medium, comprising:

a magnetic head having a slider and the storage medium including a dielectric layer; and a voltage means electrically coupled to the slider for supplying a voltage of varying polarity to an interface between the head and the medium to vertically move the head relative to the storage medium.

15. The data storage system of claim 14, wherein the voltage means further comprises means to deliver one of an AC and DC voltage to the slider.

16. A method, comprising:

providing a dielectric layer on a storage medium;

positioning the storage medium relative to a disk drive head;

applying a voltage to an interface between the head and the storage medium to vary a flying height between the head and the storage medium; and varying the polarity of the voltage applied to the interface.

17. The method of claim 16, wherein the supplying the voltage further comprises supplying the voltage to one of increase and decrease the air gap between the head and the storage medium.

18. The method of claim 16 wherein the supplying the voltage further comprises electrically coupling a voltage source to the head.

* * * * *